United States Patent [19]
Neeb et al.

[11] 3,953,737
[45] Apr. 27, 1976

[54] METHOD AND APPARATUS FOR MONITORING RADIOACTIVE PARTICLES CARRIED BY A FLOWING LIQUID

[75] Inventors: Karl-Heinz Neeb, Erlangen; Heinz Stöckert, Nürnberg; Armin Fuchs, Erlangen, all of Germany

[73] Assignee: Kraftwerk Union Aktiengesellschaft, Mulheim (Ruhr), Germany

[22] Filed: Oct. 10, 1974

[21] Appl. No.: 513,754

[30] Foreign Application Priority Data
Oct. 18, 1973   Germany............................ 2352376

[52] U.S. Cl. .......................... 250/432 R; 250/435
[51] Int. Cl.² ........................................ G01N 23/12
[58] Field of Search ......... 250/303, 308, 356, 432, 250/434, 435, 252; 340/239 F, 262, 269

[56] References Cited
UNITED STATES PATENTS

| | | | |
|---|---|---|---|
| 3,178,355 | 4/1965 | Jacobs............................ | 176/19 LD |
| 3,846,749 | 11/1974 | Curry............................. | 340/262 X |
| 3,864,574 | 2/1975 | Wilhelm et al. ................ | 250/432 |

*Primary Examiner*—Davis L. Willis
*Attorney, Agent, or Firm*—Kenyon & kenyon Reilly Carr & Chapin

[57] ABSTRACT

The radioactivity of flowing water carrying very low concentrations of radioactive nuclides, is continuously monitored by passing the flowing water through a filter means to form an increasing collection of the nuclides, which collection is continuously monitored by a radioactivity detector producing pulses at an increasing rate dependent on the radioactivity of the collection. The pulses are fed to a pulse counter having an alarm activated by a pulse counter of adjustable count limit, and this limit is adjusted upward as the collection increases with time and in proportion to the time duration of the filtering and collecting. Therefore, the alarm is not activated if the concentration of the nuclides in the flowing water remains within the predetermined value; but if this value is exceeded, the alarm is activated.

4 Claims, 3 Drawing Figures

PULSE LIMIT ADJUSTER
PULSE COUNTER
ALARM

METHOD AND APPARATUS FOR MONITORING RADIOACTIVE PARTICLES CARRIED BY A FLOWING LIQUID

BACKGROUND OF THE INVENTION

It is possible for flowing water, and possibly other liquids, to carry radioactive materials, such as radioactive nuclides. This may occur in the case of water discharged from a nuclear reactor installation but may be involved in other instances, such as industrial waste water in general. By continuously monitoring the radioactivity of the flow, the radioactivity can be kept within acceptable limits, such as by taking corrective measures at the source of the flow.

Such monitoring has been done by the use of a flow cell through which a stream of the water flow is passed and into which a beta or gamma sensitive detector is inserted, the detector being of the type which produces pulses which are fed to a conventional pulse counter which activates an alarm if the pulse rate exceeds one that is predetermined as indicating an upper limit of safety. The pulse rate is, of course, proportional to the radioactivity of the water stream.

The response probability of such equipment and the zero rate of the detector is, as a generality, about several $10^{-7}$ $\mu$Ci/ml; the different radiation properties of the radioactive nuclides carried by the stream may show greater or lesser deviations from such a value. It is desirable to increase such a response probability which in practice is often substantially less favorable because of contamination of the cell, such as in the form of deposits on the detector which cannot be avoided since the cell must be continuously in service for long time periods.

There are instances when the concentrations of radioactive nuclides or radioactive particles are very low and cannot be monitored satisfactorily in the described manner. For example, a water-cooled reactor may feed the heat-exchange tubes of a steam generator and the steam condensate may ultimately be discharged as a water flow. The heat exchanger comprises a multiplicity of tubes, and if one of these tubes leaks even slightly, the flowing water discharge may carry a very low concentration of radioactive material.

Heretofore the only way to measure such very low reactivity has been by taking samples of the water and measuring them in a laboratory, possibly after chemical concentration of the radioactive nuclide. In this way, detection limits in the order of $10^{-9}$ $\mu$Ci/ml and less can be obtained, but for practical reasons this practice is limited to the testing of random samples of the water flow. Between the sampling the actual radioactivity of the flowing water remains unknown and this may represent extended time periods.

The object of the present invention is to provide a method and apparatus for continuously monitoring flowing water, and possibly other liquids, when the radioactivity is so low as to be outside of the capability of the previously described continuous monitoring method and equipment to be used effectively.

SUMMARY OF THE INVENTION

With the above in mind, the present invention, briefly stated, involves a cell in which the detector adjacently is provided with a filter through which the stream taken from the flow is continuously filtered. The filter, which may be entirely mechanical or mechanical followed by ion-exchange material, retains a collection of any particles or nuclides positioned adjacent to the detector in the sense that it is within the effective detection range of the detector, the latter producing its usual pulse output. As the collection of radioactive substances increase, the radioactivity of the collection increases with the pulse rate output of the detector correspondingly increasing. This output is fed to any conventional pulse counter of the type which activates an alarm when a previously set pulse rate limit is reached. This limit setting is increased proportional to the time period of operation so that the alarm is not activated as long as the radioactivity of the stream does not exceed a predetermined limit, because the pulse rate limit of the counter is continuously set upwardly. However, if the radioactivity of the stream exceeds the predetermined limit, the radioactivity of the collection held by the filter means increases out of proportion with time and the alarm is activated.

In the above way a much greater sensitivity is obtained than is possible with the prior art practice. In addition, the detector operates only in a stream of filtered water, the detector remaining clean and free from interference due to deposits on the detector.

For a more thorough disclosure of this invention, reference may be had to the following:

BRIEF DESCRIPTION OF THE DRAWINGS

Several presently preferred modes for carrying out the invention, the selection of which depends on the conditions involved, are schematically illustrated by the accompanying drawings, in which.

DETAILED DESCRIPTION OF THE INVENTION

Figures 1, 2, 3:
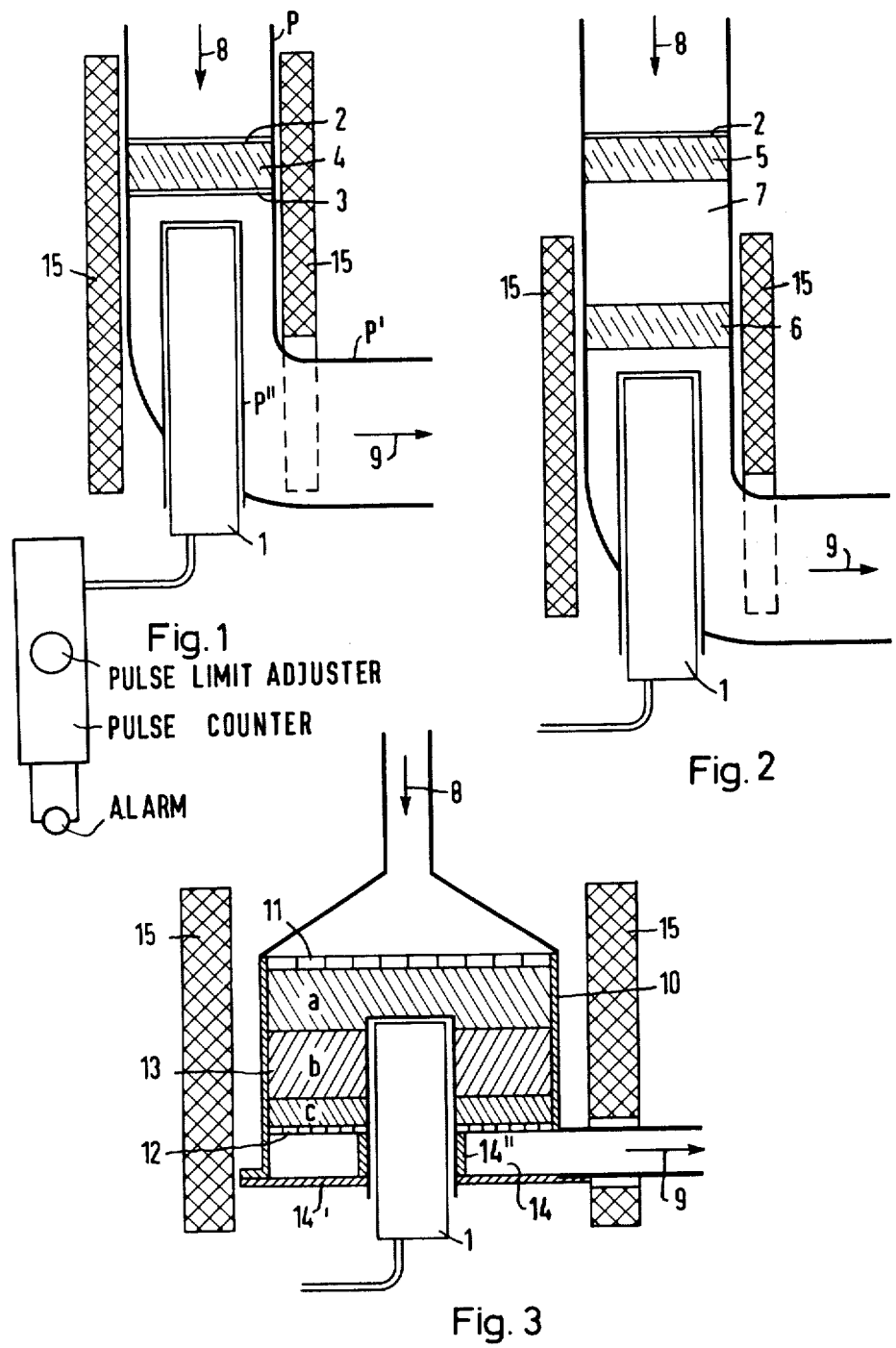
FIG. 1 is a vertical section through one form of the invention.
FIG. 2 in the same way shows a second form.
FIG. 3, also in the same way, shows a third form.

In FIG. 1 the water stream diverted from the water flow to be monitored, is carried downwardly by a vertical pipe P which bends to form an elbow P', and in which an upwardly extending casing P'' is fixed. The detector 1 inserted upwardly in this casing P''. It may be any of the prior art beta or gamma sensitive detectors producing a pulse output at a rate dependent on the intensity of the radiation detected. Adjacently upstream the filter means is positioned inside of the pipe P, this means in this instance comprising horizontal mechanical filters 2 and 3 extending completely throughout the interior area of the pipe P and being interspaced, ion-exchange material 4 being positioned between the two mechanical filters. The mechanical filters may be porous metal diaphragms or fiberglass, and they hold back radioactive nuclides adsorbed by particles carried by the stream. The ion-exchange filter 4 may be either cation-exchange or anion-exchange filters which assure effective precipitation of any ionically dissolved radioactive nuclides. It follows that the filters means acts both by mechanical filtration and adsorption.

The output of the detector 1 is shown as being fed to what may be a conventional pulse counter provided with a pulse limit adjustor and feeding to an alarm activated when a pulse rate limit, set by the pulse limit adjustor, is reached. In operation, the stream obtained from the flowing water to be monitored goes downward at 8 through the filter means 2–4 and is discharged at 9. The descending stream gradually produces a collection of any radioactive nuclides it carries on and in the filter means which is adjacently positioned upstream with respect to the detector 1, the positioning being such as to assure that the collection is within the effective detection range of the detector. The detector casing P'' is protected against deposits which might interfere with the effectiveness of the detector 1. The vertical portion of the pipe P around the active end of the detector 1 is protected against external interference radiation by shielding 15 of suitable material.

During the operation of the device, the pulse limit adjustor of the pulse counter is set upwardly proportional to time to prevent activation of the alarm so long as the radioactivity of the monitored stream is below a limit determined as being acceptable. This prevents the increasing collection of material and the consequent increase in the pulse rate output of the detector, from activating the alarm. However, if this concentration increases, the radioactivity of the collection increases out of proportion with time and the alarm is activated.

The filter means should, within the limits of current technology, be designed to remove completely all of the radioactive nuclides and particles in general. The outgoing liquid at 9 in FIG. 1 should be free from activity particles both to fully protect the detector which, depending on its exact design, can be exposed directly to the stream leaving the filter means, and also to assure that the gradually collecting radioactive substances represents truly the concentration carried by the stream entering the apparatus.

To exemplify the results that can be obtained with this new method and apparatus, with the apparatus made as shown by FIG. 1 and used for the determination of iodine 131 in the stream of water, and with the completely possible counter yield by the detector 1 for that isotope of 5% and a throughput of 50 liters of water per hour through the filter means, it is possible to obtain with an activity concentration in the water of $1 \times 10^{-7}$ $\mu$Ci/ml a net pulse rate of approximately 100 pulses per minute after only 10 minutes of operation. With an activity concentration of $1 \times 10^{-8}$ $\mu$Ci/ml, about fifty pulses per minute can be obtained after one hour. It is probable that these results can be improved considerably by a more favorable arrangement of the filter means relative to the detector, which would mean a substantial increase in the overall sensitivity of the apparatus.

The mechanical filter 2 with the ion-exchange material 4 ensures an effective separation of both ionically dissolved radioactive nuclides as well as such nuclides when bound to particles carried along by the stream. The mechanical filter 2 is precautionary and may serve to position the material 4.

Selective measurements are possible with the present invention. For example, if monitoring of iodine isotopes only is desired, a filter configuration, such as shown in FIG. 2, is useful. Here the mechanical filter 2 is followed by a cation-exchange resin 5. These are positioned at such a distance from the detector 1 as to make the latter substantially non-responsive or very little responsive to any collection at that location. Adjacently to the detector 1 and well within its effective range, an anion-exchange resin 6 is positioned so that all the stream passes through the resin. As an alternative, a cation-exchange resin may be used, pretreated with positive silver ions. In this instance, the filter 2 removes suspended particles and the filter 5 removes cations. The iodine isotopes are collected in the anion-exchange resin 6 which is practically directly above the detector 1. If a cation-exchange resin which has been pretreated with silver ions is used, it adsorbs iodine isotopes in highly diluted solutions very effectively but passes a number of other anions. Thus, it can be seen that if other radioactive nuclides are to be collected for their detection, it is only necessary to design the filter means, particularly the layer 6 of an adsorption material, specifically for the radioactive nuclide involved.

It is to be understood that when the radioactive nuclides are only bound to mechanically suspend particles carried by the flow or stream, the use of a mechanical filter alone is adequate.

The geometry of the apparatus can be modified when improved sensitivity is desired. For extremely low activity concentrations in the water stream, the geometry illustrated by FIG. 3 is advantageous where the filter material surrounds the detector 1 practically completely. The three filter layers a, b, c may be constructed as shown by FIG. 1 and with some modification as shown by FIG. 2. The filter means in this instance installed between two perforated plates 11 and 12, is contained within a relatively large diameter casing 10 which functions as the pipe P in FIG. 1. This casing has an outlet manifold or chamber 14 provided with a lower plate 14' which is removable, permitting access to the filter space for removal of the filter elements and replacement as a servicing practice. This removable bottom plate 14' also serves to position a removable sleeve 14' which holds up the lower perforated plate 12. The apparatus has the advantage of being a compact device permitting the circumferential-protection shieldng 15 to be in all cases relatively small and correspondingly compact, so that the thickness of the shielding material can be relatively great within reasonably acceptable weight limits.

It has been indicated hereinabove that liquids other than water can be monitored by the practice of the present invention. Thus, liquid metals can with proper design of the apparatus possibly also be monitored.

To continuously raise the pulse counter limit proportional to the time of operation of the apparatus or device, the pulse limit adjustor shown in FIG. 1 may be used manually. To be more practical, the increase in the pulse counter limit required to prevent activation of the alarm as long as the concentrations in the water or other liquid are within limits determined to be acceptable, a clock-controlled arrangement should be used. Other than for this, prior art pulse counters can be used with the present invention.

What is claimed is:

1. Method for monitoring radioactive nuclides carried by a flowing liquid, by immersing in the flowing liquid a radiation detector producing pulses in response to radiation; wherein the improvement comprises filtering and collecting the radioactive nuclides from said flowing liquid continuously upstream from said detector to form an increasing collection of the radioactive nuclides at a position within effective range of said detector so that said detector produces pulses at an increasing rate dependent on the radioactivity of said collection, said pulses being fed to a pulse counter having an alarm activated by a pulse count of adjustable count limit, and said limit being adjusted upward as said collection increases with time.

2. The method of claim 1 in which said limit is adjusted upward in proportion to the time duration of said filtering and collecting.

3. The method of claim 1 in which said filtering is through first a mechanical filter and next through an ion-exchange material.

4. An apparatus for monitoring radioactive nuclides carried by a flowing liquid and comprising means for forming a confined stream of said liquid, a radiation detector means positioned in said stream for producing pulses in response to radiation, filter means positioned in said stream upstream from said detector for holding back and collecting said nuclides, said filter means being positioned within the effective detection range of said detector, a pulse counter having a pulse limit adjustor, and means for indicating when said pulse counter reaches a pulse rate limit set by said adjustor.

* * * * *